No. 803,759. PATENTED NOV. 7, 1905.
F. HERLES & J. NOVÁK.
MEANS FOR REDUCING FRICTION LOSS IN TURBINES.
APPLICATION FILED NOV. 12, 1904.
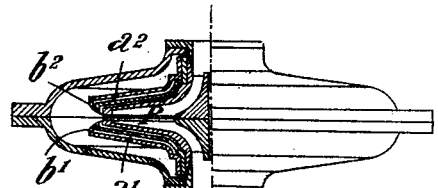
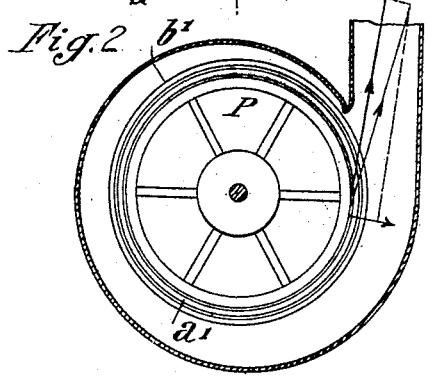
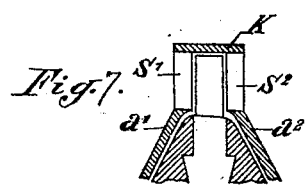
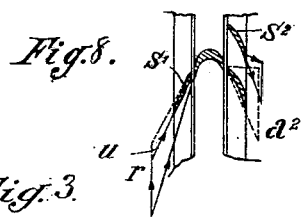
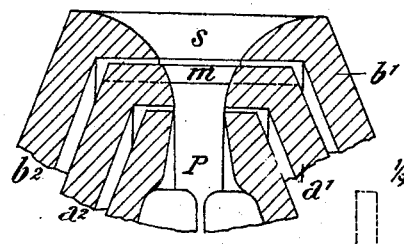
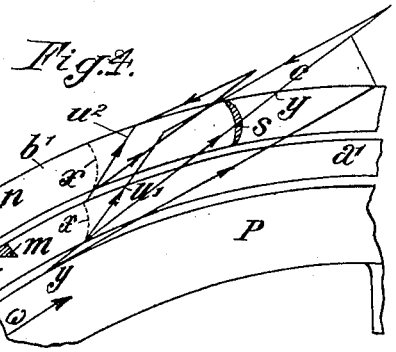
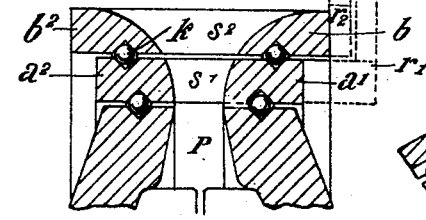
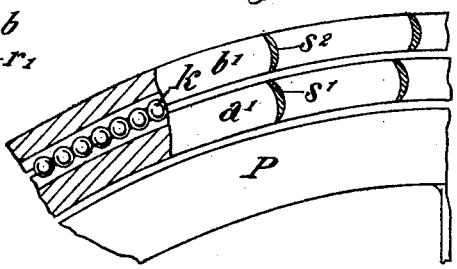
Witnesses:
L. E. Barkley
B. P. Murning
Inventors:
Franz Herles and Josef Novák
by Franz Suppleman
Attorney

UNITED STATES PATENT OFFICE.

FRANZ HERLES AND JOSEF NOVÁK, OF PRAGUE, AUSTRIA-HUNGARY.

MEANS FOR REDUCING FRICTION LOSS IN TURBINES.

No. 803,759.     Specification of Letters Patent.     Patented Nov. 7, 1905.

Application filed November 12, 1904. Serial No. 232,495.

*To all whom it may concern:*

Be it known that we, FRANZ HERLES and JOSEF NOVÁK, subjects of the Emperor of Austria-Hungary, and residents of Prague, Austria-Hungary, have invented an Improved Means for Reducing Frictional Loss in Turbines and Like Rotary Machines, of which the following is a specification.

This invention relates to means for reducing friction in rotating machines, such as centrifugal pumps, ventilators, steam and gas turbines, and other machines operated by turbines.

An object of this invention is to provide a means of this kind that will be simple and efficient.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters of reference denote corresponding parts in the several views, in which—

Figure 1 is a side elevation, partly in section, of a ventilator constructed in accordance with the invention. Fig. 2 is a plan view thereof, partly in section. Figs. 3 and 4 are details of the invention, the same being applied to a rotary pump. Figs. 5 and 6 illustrate a modified form of the invention. Figs. 7 and 8 illustrate the invention applied to a single-wheel turbine.

In the drawings, $a'$ $a^2$ $b'$ $b^2$ indicate disks which are loosely mounted on the hub of the wheel P and extend over the edge or periphery of the wheel. These disks are so constructed and positioned as to allow a space to be formed between their opposing faces for the passage of the operating fluid and have their outer edges overlapping and rounded, so that the speed of the outflowing fluid gradually decreases. These disks form movable side walls for the wheel or wheel-blades, and thus minimize the friction therebetween.

The disks $b'$ and $b^2$ are provided at their outer edge with the hoops or blades S, which are suitably spaced apart and adapted to be engaged by the fluid and be rotated at a greater speed than the intermediate disks $a'$ and $a^2$.

The disks $a'$ $a^2$ are rotated by frictional contact with the disks $b'$ $b^2$. Thus the difference of speed between the body P and disks $a'$ $a^2$ is reduced, and consequently the loss due to friction therebetween is reduced or diminished.

The blades S tie or connect the disks $b'$ $b^2$ and serve to enable the disks to withstand the pressure between them, and thereby to retain their operative position. When no blades are employed, the tie-pieces $m$ $n$ may be employed. To further reduce any possible friction that may occur, the ball-bearings K may be employed.

If so desired, rotatable rings may be employed which may be rotated either by fluid or friction or by the gear arrangement $z'$ $r'$ $z^2$ $r^2$.

In axial turbines, Figs. 8 and 9, the disks on each side of the wheel are connected by a blade-ring K, having blades $S'$ $S^2$, the blades being so bent as to connect as much of the inflowing and outflowing liquid as possible with energy.

Having fully described our invention, what we claim as new, and desire to secure by Letters Patent, is—

1. In combination with a wheel rotated by fluid, rotatable walls therefor loosely mounted on the hub of the wheel.

2. In combination with a wheel rotated by fluid, walls therefor loosely mounted on the hub of the wheel and movable independently thereof.

3. In combination with a wheel rotated by fluid, rotatable walls therefor loosely mounted on the hub of the wheel, and means for rotating the walls.

4. In combination with a wheel rotated by fluid, rotatable walls therefor loosely mounted on the hub of the wheel, the edges of the walls overlapping the periphery of the wheel.

5. In combination with a wheel rotated by fluid, rotatable walls therefor loosely mounted on the hub of the wheel, the edges of the walls being rounded.

6. In combination with a wheel rotated by fluid, rotatable walls therefor loosely mounted on the hub of the wheel, and rotatable connections between the rotating walls.

7. In combination with a wheel rotated by fluid, rotatable walls therefor loosely mounted on the hub of the wheel to either side of the wheel.

8. In combination with a wheel rotated by fluid, a series of rotatable disks arranged to either side of the wheel and movable independent thereof.

9. In combination with a wheel rotated by fluid, a series of rotatable disks arranged to either side of the wheel and movable independent thereof, the opposing faces of the disks of each series being suitably spaced.

10. In combination with a wheel rotated by fluid, a series of rotatable disks arranged to either side of the wheel and movable independently thereof, and blades carried by the outer disk of each series.

11. In combination with a wheel rotated by fluid, a series of rotatable disks arranged to either side of the wheel and movable independently thereof, and blades connecting the outer disks of each series.

12. In combination with a wheel rotated by fluid, a series of rotatable disks arranged to either side of the wheel and movable independently thereof, said disks of each series being adapted to rotate at different speeds.

In testimony whereof we have hereunto set our hands in presence of two witnesses.

FRANZ HERLES.
JOSEF NOVÁK.

Witnesses:
ADOLF SUDA,
ADOLPH FISCHER.